US005374316A

United States Patent [19]

Tilby

[11] Patent Number: 5,374,316

[45] Date of Patent: Dec. 20, 1994

[54] METHOD AND APPARATUS FOR SEPARATION OF SUGARCANE PITH FROM RIND

[76] Inventor: Sydney E. Tibly, 989 Wagonwood Crescent, Victoria, B.C., Canada, V8X 4M1

[21] Appl. No.: 637,347

[22] Filed: Jan. 4, 1991

[51] Int. Cl.[5] ........................ B02C 23/10; A47J 17/20

[52] U.S. Cl. .......................................... 127/2; 241/79; 241/167; 241/222

[58] Field of Search ................ 127/2, 43; 241/79, 167

[56] References Cited

U.S. PATENT DOCUMENTS

| | | | |
|---|---|---|---|
| 605,293 | 6/1898 | Madden | 241/222 |
| 608,630 | 8/1898 | Wright | 241/222 |
| 616,177 | 12/1898 | Adelsperger | 241/222 |
| 623,753 | 3/1899 | Winchell | 241/222 |
| 623,754 | 3/1899 | Winchell | 241/222 |
| 627,882 | 6/1899 | Sherwood | 241/222 |
| 632,789 | 9/1899 | Remy | 241/222 |
| 657,341 | 9/1900 | Dyer | 241/222 |
| 670,037 | 3/1901 | Sherwood | 241/222 |
| 675,758 | 6/1901 | Sherwood | 241/222 |
| 684,492 | 10/1901 | Adamson | 241/222 |
| 707,531 | 8/1902 | Adamson | 241/222 |
| 1,689,387 | 10/1928 | Heimlich | 19/7 |
| 2,706,312 | 4/1955 | Bobkowicz | 19/7 |
| 3,424,611 | 1/1969 | Miller | 127/2 |
| 3,424,612 | 1/1969 | Miller | 127/2 |
| 3,464,877 | 9/1969 | Miller et al. | 156/259 |
| 3,464,881 | 9/1969 | Miller et al. | 161/60 |
| 3,566,944 | 3/1971 | Tilby | 146/222 |
| 3,567,510 | 3/1971 | Tilby | 99/2 ND |
| 3,567,511 | 3/1971 | Tilby | 127/43 |
| 3,690,358 | 9/1972 | Tilby | 146/119 |
| 3,698,459 | 10/1972 | Tilby | 146/119 |
| 3,721,567 | 3/1973 | Miller et al. | 99/2 ND |
| 3,796,809 | 3/1974 | Miller et al. | 426/2 ND |
| 3,873,033 | 3/1975 | Tilby | 241/19 |
| 3,976,498 | 8/1976 | Tilby | 127/2 |
| 3,976,499 | 8/1976 | Tilby | 127/42 |
| 4,025,278 | 5/1977 | Tilby | 425/404 |
| 4,151,004 | 4/1979 | Vukelic | 127/2 |
| 4,312,677 | 1/1982 | Tilby et al. | 127/2 |
| 4,572,741 | 2/1986 | Mason | 127/2 |
| 4,636,263 | 1/1987 | Cundiff | 127/42 |
| 4,702,423 | 10/1987 | Pinto | 241/60 |
| 4,743,307 | 5/1988 | Mason | 127/2 |
| 4,816,075 | 3/1989 | Gruenewald | 127/2 |

*Primary Examiner*—Theodore Morris
*Assistant Examiner*—P. L. Hailey
*Attorney, Agent, or Firm*—Jansson & Shupe, Ltd.

[57] ABSTRACT

An improved apparatus and method for separating milled sugarcane pith from flattened rind upon discharge from a depithing station. The method includes dividing the discharge by a fixed deflector, preferably with a blunt upstream edge, into a primary pith flow and a rind flow which includes a secondary pith flow, and thereafter removing pith from the rind flow and diverting it to join pith from the primary pith flow. Preferred embodiments capture the pith in interstices of a rotating brush which merges with the secondary pith flow, turning such pith away from the rind flow, and then releasing it.

8 Claims, 3 Drawing Sheets

METHOD AND APPARATUS FOR SEPARATION OF SUGARCANE PITH FROM RIND

FIELD OF THE INVENTION

This invention is related generally to methods and apparatus for processing sugarcane and the like and, more particularly, to methods and apparatus for separation of stalks into their rind and pith constituents.

BACKGROUND OF THE INVENTION

General Background

The stalk of the sugarcane plant includes an outer rind which is a hard, wood-like fibrous substance. The rind surrounds a central core of pith, which bears nearly all of the sugar juice from which various sugar products are made. The outer surface of the rind has a thin, waxy epidermal layer, referred to herein as "dermax."

Certain other plants (e.g., sweet sorghum) are similar to sugarcane in that they are grasses having woody grass stalks. While there is frequent reference herein to sugarcane, it is to be understood that this invention applies to processing of woody grass stalks like sugarcane and sweet sorghum or certain of their constituents. At no point, including the claims, is any reference to sugarcane to be limiting.

Conventional sugarcane industry practices until today have utilized sugarcane primarily only for its sugar content. Such industry practices have involved chopping and crushing sugarcane stalks to remove the sugar juice, with the waste solids (bagasse) being used primarily only as fuel, mainly in sugar production operations.

Although such practices have been virtually uniform throughout the industry, it has been recognized that a number of very useful products may be produced from sugarcane if the sugarcane stalk is first separated into its rind, pith and dermax constituents. The many useful end-products made possible by such separation can provide great economic benefit. Such separation also provides significant efficiencies in the production of sugar.

Earlier efforts involving stalk separation, though not necessarily related to sugarcane, are reflected in the following U.S. Pat. Nos.:

605,293 (Madden)
608,630 (Wright)
616,177 (Adelsperger)
623,753 (Winchell)
623,754 (Winchell)
627,882 (Sherwood)
632,789 (Remy)
657,341 (Dyer)
670,037 (Sherwood)
675,758 (Sherwood)
684,492 (Adamson)
707,531 (Adamson)
1,689,387 (Heimlich)
2,706,312 (Bobkowicz).

Even though stalk separation efforts began as early as the late 1800's, essentially the entire sugarcane industry continued in the conventional process noted above, involving chopping and crushing of the whole stalk to extract sugar juice.

Technology in this field remained rather dormant until the 1960's, when a resurgence of development activity began, substantially all related to what has been known in the industry as the Tilby system, a cane separation system named after the principal originator, Sydney E. ("Ted") Tilby.

Broadly speaking, the Tilby system includes a multistep operation executed by various portions of a cane separator machine. Sugarcane billets, i.e., cut lengths of cane stalk preferably about 25–35 cm long, are driven downwardly over a splitter to divide them lengthwise into semi-cylindrical half billets. The two half billets of a split billet are then processed individually by symmetrical downstream portions of the separator machine.

The first of such downstream portions of the separator is a depithing station which includes a cutter roll and holdback roll for milling pith away from the rind of the half-billet while simultaneously flattening the rind. The next downstream portion is a dermax removal station from which the rind emerges ready for subsequent processing in a variety of ways, including slitting, chipping and/or many other processing steps. The pith is conveyed away from the separator machine to an extraction station where its sugar juice is removed.

A significant number of patents related to the Tilby system and improvements in such system have been granted, beginning in the 1960's. These and other fairly recent United States patents related generally to sugarcane processing are as follows:

3,424,611 (Miller)
3,424,612 (Miller)
3,464,877 (Miller et al.)
3,464,881 (Miller et al.)
3,566,944 (Tilby)
3,567,510 (Tilby)
3,567,511 (Tilby)
3,690,358 (Tilby)
3,698,459 (Tilby)
3,721,567 (Miller et al.)
3,796,809 (Miller et al.)
3,873,033 (Tilby)
3,976,498 (Tilby)
3,976,499 (Tilby)
4,025,278 (Tilby)
4,151,004 (Vukelic)
4,312,677 (Tilby et al.)
4,572,741 (Mason)
4,636,263 (Cundiff)
4,702,423 (Pinto)
4,743,307 (Mason)
4,816,075 (Gruenewald).

The Tilby system, when finally fully commercialized, can provide substantial outputs of several high-value products. This greatly increases cash yields per ton of sugarcane, a factor of significant importance to an industry in which profitability in recent years has been marginal at best. This is important generally, but is of particular importance to the many developing countries in which a flourishing sugarcane industry would be a boon to economic growth and stability.

Considering that sugarcane is one of the most rapidly growing, easily developed, and readily accessible sources of biomass, full commercialization of the Tilby system can significantly reduce dependence on forests and on certain other crops and resources. Among the products which can be made from sugarcane constituents separated by the Tilby system are sugar in an increased variety of forms, foods and food additives, animal feeds, a variety of wood products and building materials, alcohol for a variety of purposes, paper and other pulp-containing products, and a variety of specialty products.

While substantial technical development has occurred over a period of many years with respect to the Tilby system, a number of difficult and critical problems have remained. The failure to overcome such problems has prevented full commercialization of the Tilby system. The invention described and claimed herein is directed to the solution of certain of these problems.

SPECIFIC BACKGROUND

One significant problem relates to establishment of separate flows of milled pith and flattened rind after the depithing operation performed between the cutter and holdback rolls. Milled pith and flattened rind are, of course, processed separately for separate purposes, and the efficiencies of the operation slip to the extent that milled pith stays with flattened rind or otherwise fails to reach the line for subsequent processing of milled pith.

Related to this is the additional problem of system jamming which can occur if flattened rind does not flow freely away from the pith-milling station but instead gets "hung-up." Such jamming is more prone to occur if certain steps are taken for the important purpose of assuring that the milled pith stays together in a single stream.

The normal approach to achieving the latter purpose—that is, keeping the flow of milled pith together, may involve placing a deflector element as close as possible to the nip (i.e., the common tangent line or near-tangent zone) of the cutter and holdback rolls and making its upstream edge as sharp as possible to allow it to be crowded very close to the nip. But such crowding and sharp edge exacerbate the problem of jamming, tend to allow a buildup of pith and rind fibers on the edge, and even allow some rind pieces to pass into the flow of milled pith.

Furthermore, given the desirability of cutter and holdback roll sets of large axial dimension in order to accommodate commercially-viable high throughputs, it has been found impractical to hold the fine tolerances required to keep a sharp upstream edge of a deflector properly positioned along a line crowded toward the nip. Placement close to the nip would seem to be facilitated by reducing the radial dimensions of the cutter and holdback rolls. But reducing even radial dimensions is not consistent with higher throughputs, and even tends to cause problems involving half-billets failing to properly enter the depithing station.

Various improvements have been devised to address problems related to achieving good division of the material discharged from the depithing station into separate pith and rind flows. For example, U.S. Pat. No. 3,976,498 (Tilby et al.) discloses the concept of using a deflector with an upstream edge having a smooth rounded profile. While this provided some relief, many of the above problems continued. And, the rounding of the upstream edge of the deflector allowed more milled pith to pass with the rind flow to the dermax-removing station, where its valuable juice content was lost.

The continuing problems led to the improvement disclosed in later U.S. Pat. No. 4,151,004 (Vukelic), which discloses a rotating deflector edge device using a moving part to avoid accumulation of fibers on the deflector. Such device is impractical for a number of reasons and failed to fully address the above-noted problems. It has not been developed further. It is noteworthy that this later patent was held by the entity holding U.S. Pat. No. 3,976,498; this shows the inadequacy of the earlier rounded-profile concept as a complete commercially-acceptable solution to the above-noted problems.

OBJECTS OF THE INVENTION

It is an object of this invention to provide a method and apparatus for separating sugarcane pith from sugarcane rind which overcome the shortcomings and problems of the prior art, including those mentioned above.

Another object of this invention is to provide an improved method and apparatus for separating the milled pith from flattened rind as such materials are discharged from the depithing station.

Another object of this invention is to provide an improved apparatus and method which eliminate jamming of the discharge of the depithing station.

Another object of this invention is to provide an improved apparatus and method for sugar which avoid waste of any portion of the discharge from the depithing station and thereby increase efficient use of the constituents of sugarcane, sweet sorghum and the like.

Still another object of this invention is to solve the above-noted problems in a manner readily applicable to large-scale commercial equipment having substantial throughput rates.

These and other important objects will be apparent from the descriptions of this invention which follow.

SUMMARY OF THE INVENTION

The method and apparatus of this invention overcome the above-noted problems and are useful in large-scale commercial sugarcane and sweet sorghum separation operations.

This invention is based in part on the realization that, contrary to previous thinking, it is not necessary to fully separate the milled pith and flattened rind into separate flows immediately at the point of discharge from the depithing station. Instead, while care is taken to be sure that half-billet rinds flow only along a rind flow path, it is accepted that a significant amount of milled path will not enter a primary milled pith flow, but instead form a secondary milled pith flow which moves with the rind flow. Then, special accommodations are made such that the secondary milled pith flow quickly joins pith from the primary pith flow.

Thus, the method of this invention includes dividing the depithing station discharge by fixed-member deflection of the discharge into a primary milled pith flow and a rind flow which includes a secondary milled pith flow, and thereafter removing the secondary milled pith flow from the rind flow and diverting the secondary pith flow to join pith from the primary pith flow. The removing and diverting step of this invention is part of a continuous process in which pith and rind move downstream without interruption.

In preferred embodiments, the removing and diverting step includes capturing the pith from the secondary pith flow in interstices formed within the bristle portion of a rotating brush roll which bristle portion merges with the secondary pith flow, holding such captured pith within the interstices through an arc of brush roll rotation to turn the secondary pith flow away from the rind flow, and finally releasing such captured pith from the interstices in a direction away from the rind flow. The releasing step is most preferably by means of the centrifugal force which is generated during brush roll rotation.

In highly preferred embodiments, the removing and diverting step includes capturing in a subsequent similar brush the pith from the secondary pith flow which is not captured by the previous brush. In other words, multiple brush rolls may be used in series.

It is highly preferred in such situations for one of the brush rolls to be rotated at a speed such that its bristle tips move along the rinds in the direction of rind flow at a linear speed in excess of the speed of the rind flow. This allows pith adhering to the rinds to be brushed off the rinds to join pith from the primary pith flow.

The apparatus of this invention is sugarcane separation apparatus of the type having means for splitting billets, opposed cutter and holdback rolls to receive half billets and remove pith from rinds, and a deflector with an upstream edge in the discharge zone formed by the rolls, a rind-receiving side extending from the edge in substantial alignment with the common tangent plane of the rolls, and an opposite side defining a pith flow zone.

The improved apparatus of this invention includes: the upstream edge of the deflector being blunt, such blunt edge and the rind-receiving side of the deflector having a surface of friction-reducing material, and the edge being located and configured to divide the discharge into a primary milled pith flow in the pith flow zone and a rind flow which includes a secondary milled pith flow; and means downstream of the deflector to remove the secondary milled pith flow from the rind flow and divert the secondary pith flow to join pith from the primary pith flow.

A preferred removing and diverting means includes at least one rotatable brush roll downstream of the deflector, each such brush roll having a bristle portion with interstices therein, such bristle portion positioned to merge on rotation with the secondary milled pith flow and receive pith into the interstices. In such preferred embodiments, there is a coacting feed roll for each brush roll, the rotation of such brush and feed rolls serving to advance the rind while the brush roll captures pith as described.

The bristles of the brush rolls are preferably arranged in offset rows of bristle bunches. This facilitates the capturing of pith as it flows with the rind in a downstream direction.

Preferred embodiments also include, as part of the removing and diverting means, a divider downstream of each brush roll. Each such divider has a rind side and a pith side, the pith side being adjacent to the bristle portion along an arc extending away from the rind side.

The rind-receiving side of the deflector and the rind side of each downstream divider extend substantially along a common curved path, the bristle portions of each brush roll having bristle tips which project beyond such curved path, in position to facilitate capturing of pith moving in the path of rind flow.

As already noted, it is preferred to have a plurality of brush roll, feed roll, and divider sets, and in such cases to rotate one of the brush rolls at a speed such that its bristle tips move along the rinds in the direction of rind flow at a linear speed in excess of the speed of the rind flow. This allows removal of pith, as noted above. In such cases, the feed roll paired with such brush roll may be toothed to hold the rind from acceleration in the downstream direction during such brushing.

In preferred embodiments of this invention, the blunt upstream edge of the deflector is contoured such that in cross-section its radius along the rind-receiving side of the deflector is greater than its radius along the opposite side. This tends to assure that flattened rind will pass such edge on the intended side.

DETAILED DESCRIPTIONS OF PREFERRED EMBODIMENTS

Figure 1:
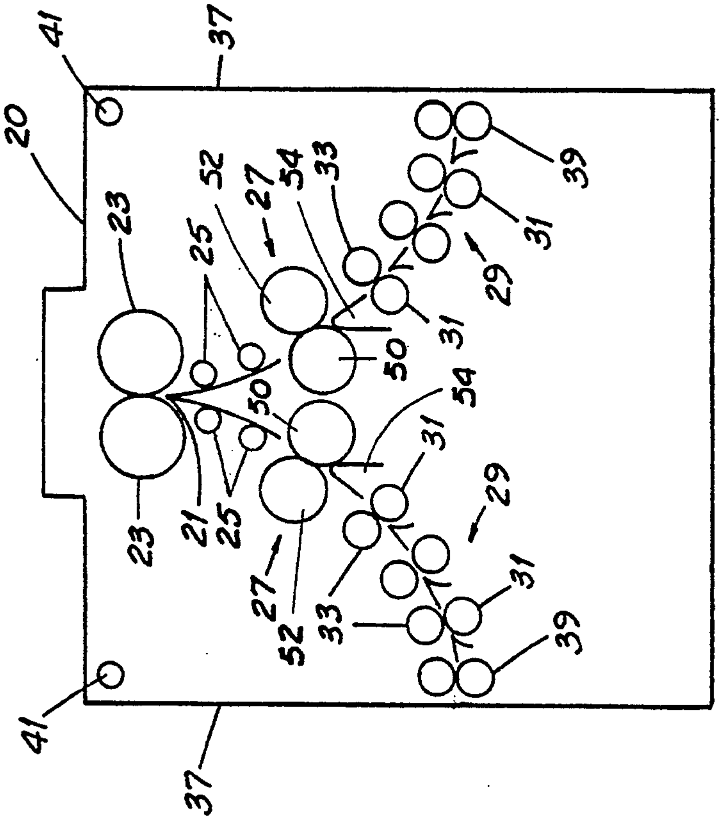
FIG. 1 is a schematic front elevation of a sugarcane separation unit in accordance with this invention.

FIG. 1 shows a tower-like separator unit 20 used for splitting and processing sugarcane billets. As known in the prior art, separator unit 20 is symmetrical in a "mirror-image" arrangement, the two sides serving to process the half-billets resulting from billet splitting. The two sides of separator unit 20, as is known in the prior art, include portions mounted on wings 37 which can pivot upwardly about pivots 41 to facilitate servicing of unit 20.

Separator unit 20 receives whole billets of sugarcane, sweet sorghum, or the like end-first from above. Such billets are forced downwardly onto a splitting knife 21 by a pair of feed rolls 23. This splits the billets longitudinally into half-billets. Each half-billet, with its interior pith now exposed, moves past rotating control brushes 25 into a depithing station 27. At depithing station 27, the sugar-bearing pith of the half-billet is cut away from the half-billet rind in fairly small pieces and, at the same time, such rind is flattened.

As indicated above, this invention relates to separation of the flow of cut ("milled") pith from the flow of flattened rinds. This is accomplished using the apparatus illustrated in detail in FIG. 2.

Figure 2:
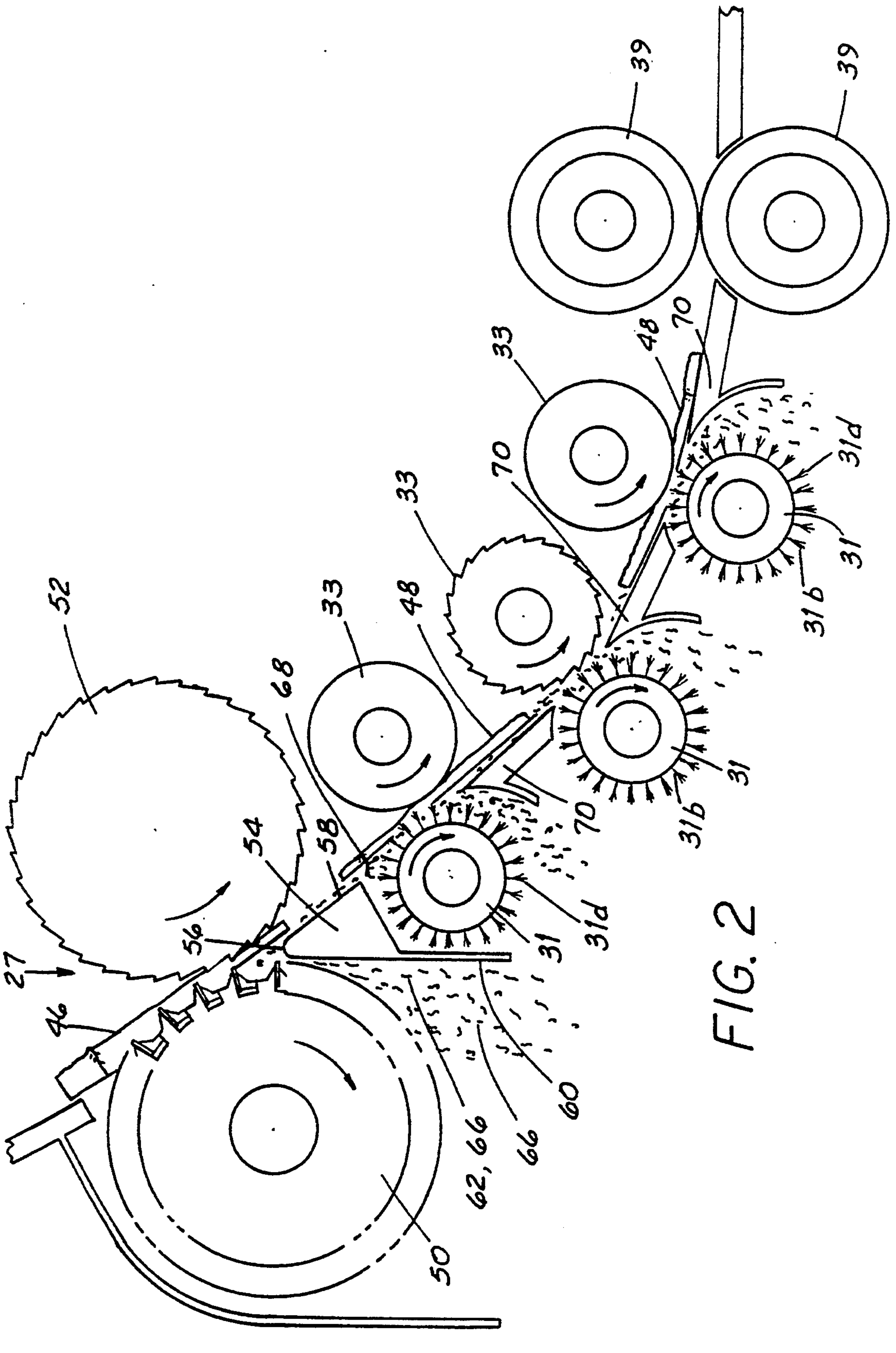
FIG. 2 is an enlarged view of a portion of FIG. 1, illustrating details of the invention.

As shown best in FIG. 2, each depithing station 27 includes a cutter roll 50 and a hold-back roll 52 between which half-billet 46 moves to be separated into milled pith and flattened rind 48. Downstream of cutter and hold-back rolls 50 and 52 is a deflector 54 which is positioned in the discharge zone of rolls 50 and 52. Deflector 54 has a blunt upstream edge 56, a rind-receiving side 58, and an opposite side 60 which defines a primary pith flow zone 62.

Deflector 54 is made of ultra-high molecular weight polyethylene so that rind-receiving side and upstream edge 56 are have a low-friction characteristic. An alternative is to have a metal surface coated with Teflon or some other low-friction material. This facilitates passage of discharged material, to minimize or eliminate material hang-up on edge 56.

Figure 3:
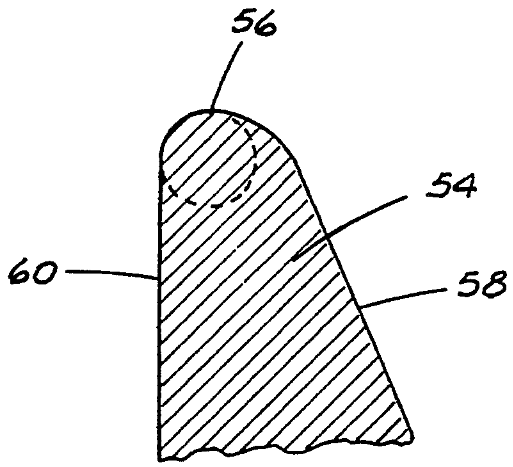
FIG. 3 is a further enlarged fragmentary sectional view showing the upstream edge of the deflector.

As illustrated in FIG. 3, blunt upstream edge 56 of deflector 54 is contoured such that in cross-section its radius along rind-receiving side 56 is greater than its radius along opposite side 60. This tends to assure that flattened rind will pass edge 56 on the intended side. This configuration and the low-friction surface characteristic mentioned allow the normal discharge from depithing station 27 to facilitate cleaning of deflector edge 56.

Deflector 54 need not be extremely close to cutter and hold-back rolls 50 and 52. Deflector 54 is located in position so that it divides the discharge of depithing station 27 into a primary milled pith flow, illustrated by numeral 66, and a rind flow which includes a secondary milled pith flow 68.

Downstream of deflector 54 is a series of three rotatable brush rolls 31, each having a coacting feed roll 33. Each brush roll 31 has a bristle portion **31*b* made up of bristle bunches 31*a* with interstices 31*c* therebetween. For each brush roll 31, bristle portion 31*b* is positioned to merge on rotation with secondary milled pith flow 68 and receive pith into interstices 31*c*. The rotation of each brush roll 31 and its corresponding coacting feed roll 33 serves to advance flattened rinds while brush roll 31** captures pith.

Figure 4:
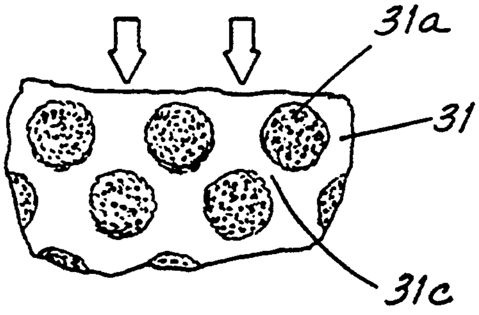
FIG. 4 is a fragmentary schematic view of a surface of a brush roll, showing the bristle pattern.

As shown in FIG. 4, bristle bunches **31*a* on each brush roll 31** are arranged in offset rows. As noted above, this facilitates the capturing of pith as it flows with the rind in a downstream direction.

Downstream of each brush roll 31 is a divider 70 which has a rind side 72 and a pith side 74. Pith side 74 is adjacent to bristle portion **31*b* along an arc which extends away from rind side 72. Rind-receiving side 58 of deflector 54 and rind side 72 of each downstream divider 70 extend along a common curved path. Bristle portions 31*b* of each brush roll 31 have bristle tips 31*d*** which project beyond such curved path and are positioned to facilitate capturing of pith.

The first and third brush rolls 31 rotate at a speed such that their bristle tips **31*d* have a linear speed about equal to the speed of rind flow. The first and third coacting feed rolls 33 have knurled surfaces, not shown, and these two feed rolls rotate at the same linear speed as that of the first and third brush rolls 31**. This rotation serves to move flattened rinds along the line. The middle coacting feed roll also rotates at the same speed, but the middle brush roll rotates at a greater linear speed such that its bristle tips brush milled pith from the rinds. The middle feed roll has a toothed surface to perform a hold-back function during such brushing action, preventing acceleration of the rind.

The apparatus of this invention may be made using materials which would be apparent to those skilled in the art who are made aware of this invention.

While the principles of this invention have been described in connection with specific embodiments, it should be understood clearly that these descriptions are made only by way of example and are not intended to limit the scope of the invention.

I claim:

1. In sugarcane separation apparatus of the type having means for splitting billets, opposed cutter and hold-back rolls to receive half billets and remove pith from rind, and a deflector with an upstream edge in the discharge zone formed by the rolls, a rind-receiving side extending from the edge in substantial alignment with the common tangent plane of the rolls, and an opposite side defining a pith flow zone, the improvement comprising:

the edge being blunt and having, along with the rind-receiving side, a surface of friction-reducing material, the edge located and configured to divide the discharge into a primary milled pith flow in the pith flow zone and a rind flow which includes a secondary milled pith flow; and means downstream of the deflector to remove the secondary milled pith flow from the rind flow and divert the secondary pith flow to join pith from the primary pith flow.

2. The sugarcane separation apparatus of claim 1 wherein the removing and diverting means comprises:

at least one rotatable brush roll downstream of the deflector, each such brush roll having a bristle portion with interstices therein, such bristle portion positioned to merge on rotation with the secondary milled pith flow and receive pith therefrom in the interstices; and a coacting feed roll for each brush roll to advance the rind while the brush roll receives loosened pith therein.

3. The sugarcane separation apparatus of claim 1 wherein the blunt upstream edge of the deflector is contoured such that in cross-section its radius along the rind-receiving side of the deflector is greater than its radius along the opposite side, thereby to facilitate passage of rinds.

4. The sugarcane separation apparatus of claim 2 wherein the removing and diverting means further includes a divider downstream of each brush roll, the divider having a rind side and a pith side adjacent to the bristle portion along an arc away from the rind side, the rind-receiving side of the deflector and the rind side of each downstream divider extending substantially along a common curved path, the bristle portion having bristle tips projecting beyond such curved path.

5. The sugarcane separation apparatus of claim 2 further comprising means to rotate the brush roll and feed roll in the downstream direction to advance the rinds.

6. The sugarcane separation apparatus of claim 4 having a plurality of brush roll, feed roll, and divider sets.

7. The sugarcane separation apparatus of claim 5 having a plurality of brush roll, feed roll, and divider sets.

8. The sugarcane separation apparatus of claim 7 wherein the rotation means rotates one of the brush rolls at a speed such that its bristle tips move along the rinds in the direction of rind flow at a linear speed in excess of the speed of the rind flow, whereby pith adhering to the rinds is brushed therefrom.

* * * * *